E. R. Embry,
Churn.
No. 97,179.    Patented Nov. 23, 1869.

Witnesses.
E. R. Brown
G. A. Smith

Edwin R. Embry
Inventor,
By J. C. Theaker
his attorney.

United States Patent Office.

EDWIN R. EMBRY, OF RICHMOND, KENTUCKY.

Letters Patent No. 97,179, dated November 23, 1869.

IMPROVEMENT IN CHURNS.

The Schedule referred to in these Letters Patent and making part of the same.

*To all whom it may concern:*

Be it known that I, EDWIN R. EMBRY, of Richmond, in the county of Madison, and State of Kentucky, have invented a new and useful Churn; and I do hereby declare that the following is a full, clear, and exact description thereof, reference being had to the accompanying drawings, making part of this specification, and to the letters of reference marked thereon.

The nature of my invention consists in the employment of a series of detachable breakers, which may be readily removed for the purpose of cleansing, &c. Also, in the employment of a peculiar form of dasher.

To enable those skilled in the art to which my invention appertains, to make and use the same, I will proceed to describe its construction and operation.

In the drawings—

Figure 1:
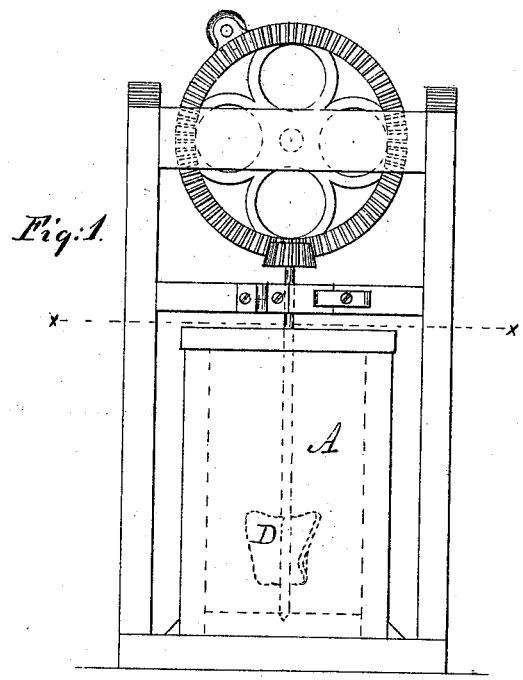
Figure 1 is a side elevation.
Figure 5:
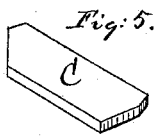
Figure 5 is a view of one of the braces which hold the breakers in place.
Figure 3:
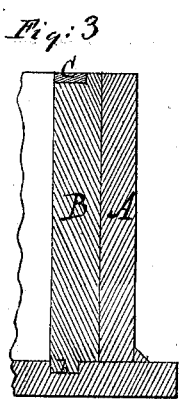
Figure 3 is a vertical section, taken in the line y y, fig. 2.
Figure 2:
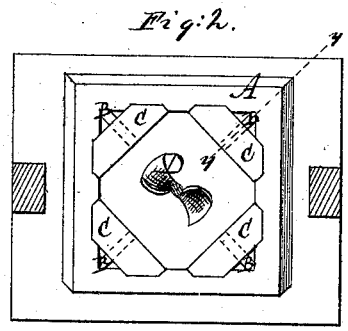
Figure 2 is a transverse section, taken in the line x x, fig. 1.
Figure 4:
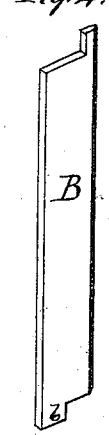
Figure 4 is a view of one of the breakers.

The churn A may be either quadrangular or polygonal in form, and at each angle is provided with a detachable breaker.

The breakers B consist of strips of wood, or other suitable material, of a length corresponding to the height of the churn, and of any suitable width; at the lower ends are tenons, b, which fit in corresponding mortises in the bottom of the churn, and at the upper ends are shoulders, which engage with braces, by which they are held in position.

The braces C are made to fit in notches in the upper edge of the churn in such a manner that when in place they lie diagonally across the churn.

The dasher D consists of one or more spirally curved blades or wings attached to a vertical dasher-rod, to which motion is imparted by means of bevel-gearing at the upper end of the rod.

As the dasher revolves, the cream is thrown against the breakers with sufficient force to rupture the capsules, the operation being facilitated by the peculiar form of the dasher, and the arrangement of the breakers with relation to the dasher.

When the churning is completed, the braces can be removed, and the breakers taken out and divested of whatever particles of butter may adhere thereto, thoroughly cleansed, and replaced in the churn.

What I claim as new, and desire to secure by Letters Patent, is—

The dasher D, formed with spirally curved blades or wings, in combination with the detachable breakers, when constructed and operating as herein shown and described.

EDWIN R. EMBRY.

Witnesses:
JAMES H. EMBRY,
JOHN TAYLOR.